(12) United States Patent
Fukui et al.

(10) Patent No.: US 10,220,491 B2
(45) Date of Patent: Mar. 5, 2019

(54) ELECTRIC CLAMP APPARATUS

(71) Applicant: SMC KABUSHIKI KAISHA, Chiyoda-ku (JP)

(72) Inventors: Chiaki Fukui, Abiko (JP); Noriyuki Miyazaki, Kashiwa (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 194 days.

(21) Appl. No.: 14/369,914

(22) PCT Filed: Oct. 11, 2012

(86) PCT No.: PCT/JP2012/076870
§ 371 (c)(1),
(2) Date: Jun. 30, 2014

(87) PCT Pub. No.: WO2013/111399
PCT Pub. Date: Aug. 1, 2013

(65) Prior Publication Data
US 2014/0361478 A1    Dec. 11, 2014

(30) Foreign Application Priority Data

Jan. 27, 2012  (JP) ................. 2012-015329

(51) Int. Cl.
B25B 5/06    (2006.01)
B25B 5/04    (2006.01)
B23Q 3/06    (2006.01)

(52) U.S. Cl.
CPC .................. *B25B 5/06* (2013.01); *B23Q 3/06* (2013.01); *B25B 5/04* (2013.01); *B25B 5/064* (2013.01)

(58) Field of Classification Search
CPC ........... B25B 5/02; B25B 5/103; B25B 5/122; B25B 5/12; B25B 1/18; B25B 1/20;
(Continued)

(56) References Cited

U.S. PATENT DOCUMENTS 3,466,896 A * 9/1969 Pfarrwaller ............... F16D 1/04
                                                      464/91
4,500,081 A * 2/1985 Carossino .......... B23Q 11/0875
                                                     269/100
(Continued)

FOREIGN PATENT DOCUMENTS

DE    101 59 874 C1    2/2003
FR    2 787 164 A1     6/2000
(Continued)

OTHER PUBLICATIONS

International Search Report and Written Opinion dated Jan. 4, 2013 in PCT/JP2012/076878 dated Oct. 11, 2012.
(Continued)

*Primary Examiner* — Joseph J Hail
*Assistant Examiner* — J Stephen Taylor
(74) *Attorney, Agent, or Firm* — Oblon, McClelland, Maier & Neustadt, L.L.P.

(57) ABSTRACT

An electric clamp apparatus includes a body, a rotary drive unit which is driven rotatably by an electric signal, and a rotary body rotated under a driving action of the rotary drive unit. Gear teeth of a clamp arm are enmeshed with helical screw grooves formed on the outer circumferential surface of the rotary body. The rotary body is rotated by driving the rotary drive unit, whereby the clamp arm, which is enmeshed with the screw grooves, is rotated through a predetermined angle to bring about a clamped state for clamping a workpiece.

5 Claims, 5 Drawing Sheets

(58) Field of Classification Search
CPC ......... B25B 1/205; B25B 5/061; B25B 5/087; B23Q 35/08
USPC ...................................... 269/32, 24–27, 228
See application file for complete search history.

(56) References Cited

U.S. PATENT DOCUMENTS

| | | | | |
|---|---|---|---|---|
| 5,080,336 | A * | 1/1992 | Carossino | B25B 5/163 269/226 |
| 5,516,087 | A * | 5/1996 | Schmid | B23Q 1/28 269/226 |
| 5,709,605 | A * | 1/1998 | Riefe | B62D 1/192 464/162 |
| 6,523,431 | B2 * | 2/2003 | Ozsoylu | B62D 5/0409 74/388 PS |
| 6,763,738 | B1 * | 7/2004 | Tsutsui | B62D 5/0409 74/388 PS |
| 7,004,459 | B2 * | 2/2006 | Sato | B25B 5/08 269/216 |
| 7,213,677 | B2 * | 5/2007 | Nakamura | B62D 5/0409 180/444 |
| 2004/0075207 | A1 | 4/2004 | Sato et al. | |
| 2004/0113342 | A1 | 6/2004 | Tunkers | |
| 2004/0135302 | A1 * | 7/2004 | Sato | B25B 5/06 269/225 |
| 2004/0150150 | A1 | 8/2004 | Sato et al. | |
| 2004/0210365 | A1 * | 10/2004 | Tanaka | B62D 5/0409 701/41 |
| 2005/0126865 | A1 | 6/2005 | Sato et al. | |
| 2007/0125193 | A1 * | 6/2007 | Augustine | F16H 1/16 74/339 |
| 2010/0025142 | A1 * | 2/2010 | Staib | B60N 2/4613 180/271 |
| 2011/0057367 | A1 * | 3/2011 | Hasegawa | F16F 7/1011 267/140.14 |

FOREIGN PATENT DOCUMENTS

| | | | | |
|---|---|---|---|---|
| FR | 2 828 123 | A1 | 2/2003 | |
| JP | 59-161242 | A | 9/1984 | |
| JP | 62-150032 | U | 9/1987 | |
| JP | 7-185979 | A | 7/1995 | |
| JP | 2003-326432 | | 11/2003 | |
| JP | 2004-141989 | | 5/2004 | |
| JP | 2004-216515 | | 8/2004 | |
| JP | 2005-169604 | | 6/2005 | |
| JP | 2011219036 | * | 11/2011 | ........... B62D 5/0409 |

OTHER PUBLICATIONS

Office Action dated Jan. 13, 2015 in Japanese Patent Application No. 2012-015329 (with partial English language translation).

* cited by examiner

US 10,220,491 B2

ELECTRIC CLAMP APPARATUS

TECHNICAL FIELD

The present invention relates to an electric clamp apparatus, which is capable of clamping a workpiece on an automated assembly line or the like.

BACKGROUND ART

Heretofore, in an automated assembly line for automobiles, an assembly process has been carried out in which clamping is performed by a clamp apparatus for overlaying and positioning a plurality of preformed body panels, and then the body panels are welded together.

The present applicant has proposed an electric clamp apparatus as disclosed in Japanese Laid-Open Patent Publication No. 2005-169604. In the electric clamp apparatus, a clamp arm is provided for rotation on a body equipped with an electric motor, and a rotary drive force of the electric motor is transmitted through a speed reducing drive system, whereby the clamp arm is rotated for clamping a workpiece.

SUMMARY OF INVENTION

A general object of the present invention is to provide an electric clamp apparatus which, with a simple structure, is capable of reliably maintaining workpieces in a clamped condition even when an electric motor is not energized.

The present invention is an electric clamp apparatus comprising a body, a drive unit which is driven rotatably by an electric signal, a clamp arm disposed rotatably with respect to the body for gripping a workpiece, and a transmission mechanism for transmitting a rotary drive force of the drive unit to the clamp arm, wherein the transmission mechanism includes a rotary body, which is rotated upon being driven by the drive unit and having helical screw grooves formed on an outer circumferential surface thereof, and a gear connected to the clamp arm and having gear teeth enmeshed with the screw grooves, wherein by rotation of the rotary body, a rotary drive force is transmitted to the clamp arm through the gear.

According to the present invention, for example, even in the case that input of the electric signal to the drive unit is suspended, since rotary movement of the clamp arm can be regulated by meshing of the clamp arm with respect to the rotary body, the workpiece can reliably be maintained in a clamped condition by the clamp arm, and together therewith, the structure of the electric clamp apparatus can be simplified, since there is no need to provide a separate locking means capable of restricting rotary movement in the clamped state.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
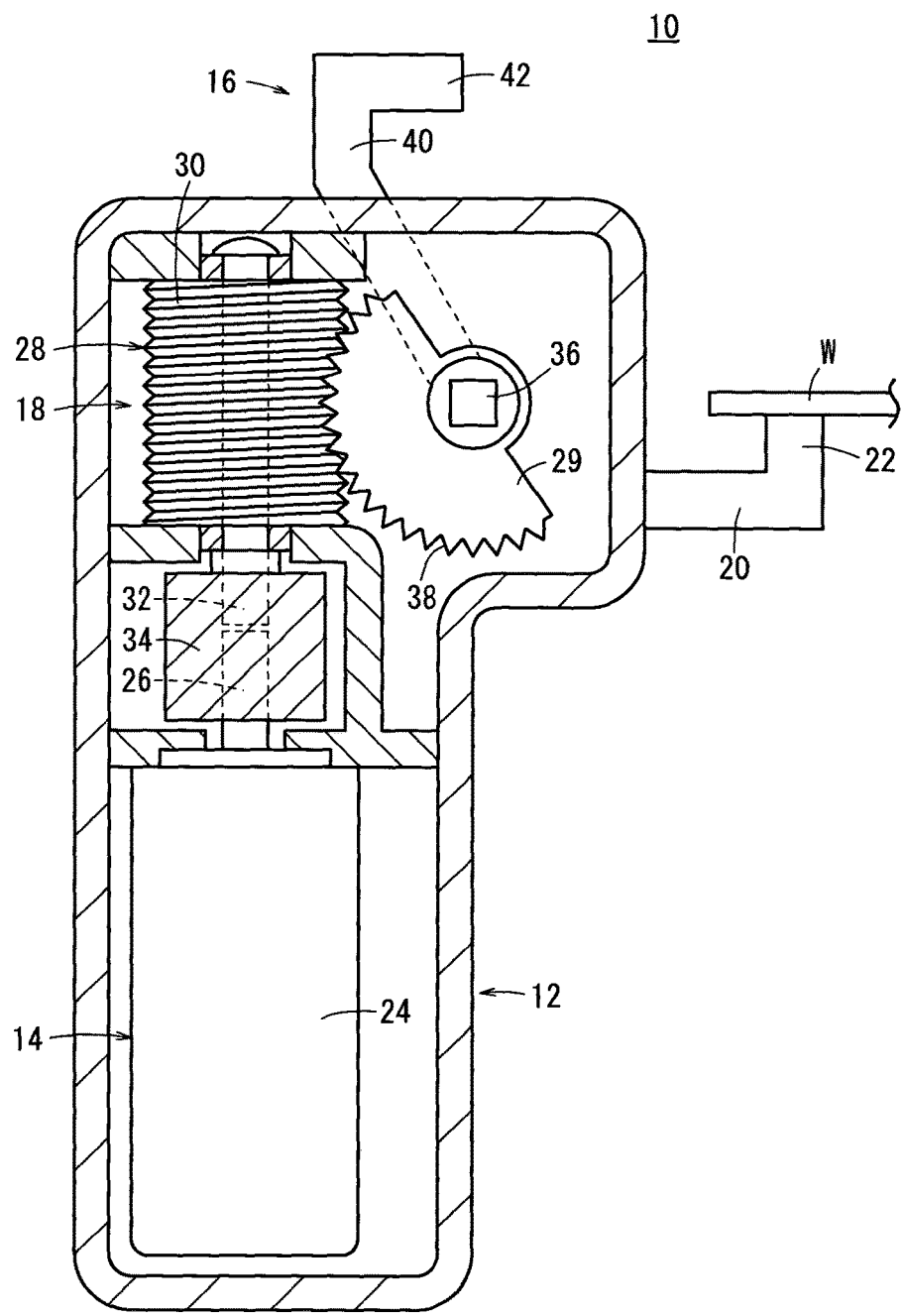
FIG. 1 is an overall structural view showing an electric clamp apparatus according to a first embodiment of the present invention.
Figure 2:
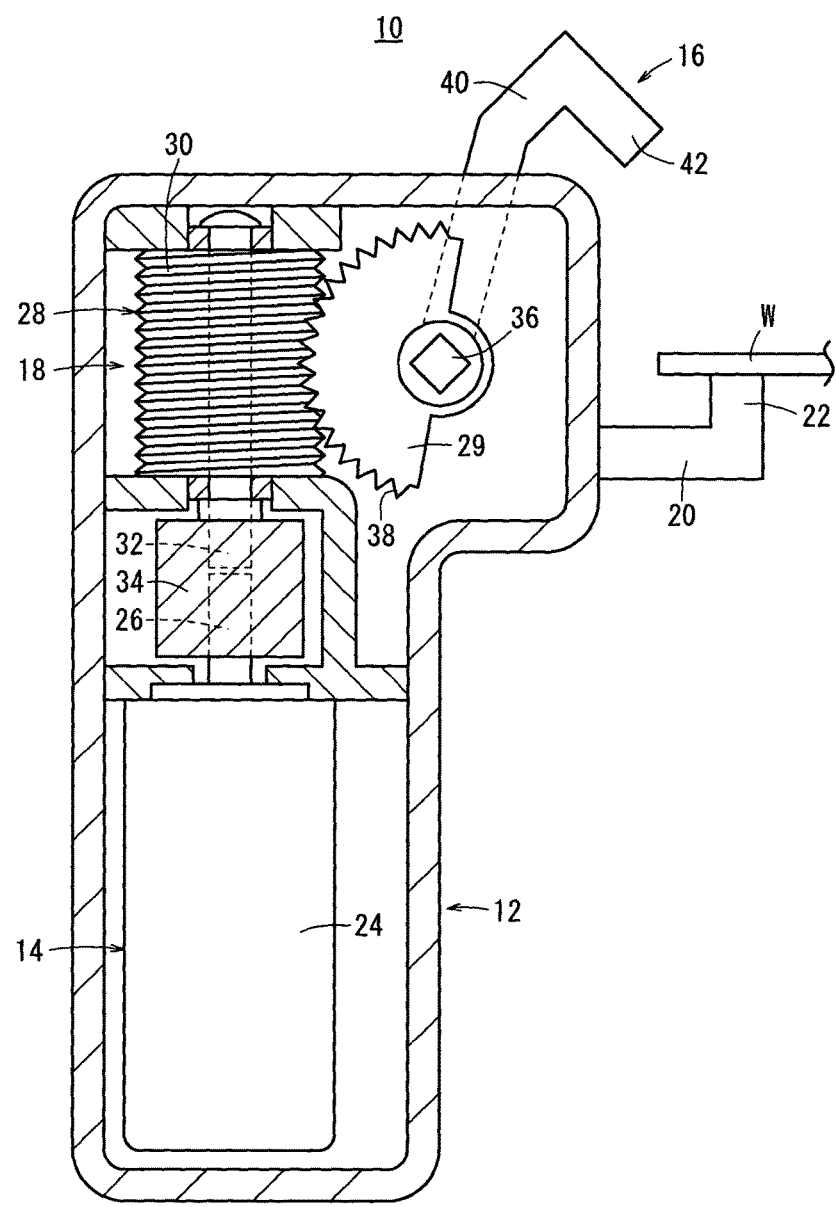
FIG. 2 is an overall structural view showing a condition in which a clamp arm in the electric clamp apparatus of FIG. 1 is rotated through a predetermined angle.
Figure 3:
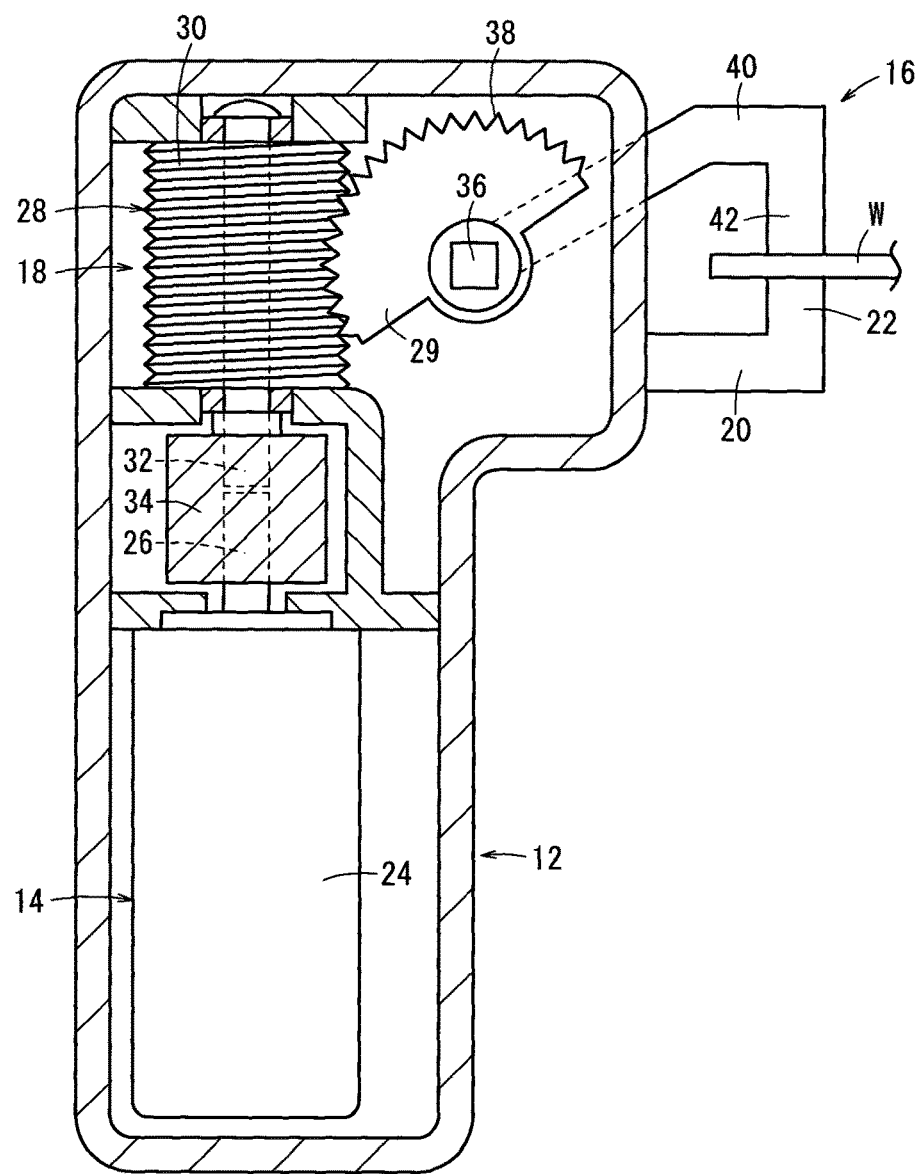
FIG. 3 is an overall structural view showing a clamped state in which the clamp arm in the electric clamp apparatus of FIG. 2 is rotated further to clamp a workpiece.

As shown in FIGS. 1 through 3, an electric clamp apparatus 10 includes a body 12, a rotary drive unit 14 disposed in the interior of the body 12, a clamp arm 16 disposed rotatably with respect to the body 12 and which is capable of gripping a workpiece W, and a drive force transmission mechanism (transmission mechanism) 18, which transmits a drive force of the rotary drive unit 14 to the clamp arm 16.

The body 12, for example, is formed with an elongate substantially rectangular shape in cross section extending in a vertical direction, and is provided with a support member 20, which projects laterally on an upper part of the body. The support member 20 projects outwardly in a horizontal direction having a predetermined length with respect to a side surface of the body 12, and a gripping member 22 is formed on an upper end of the support member 20. Additionally, as shown in FIG. 3, at a time of clamping when the clamp arm 16 is rotated, a workpiece W is clamped between the clamp arm 16 and the support member 20.

The rotary drive unit 14 is made up, for example, from a rotary drive source 24 such as an induction motor, a brushless motor, or the like, which is driven rotatably by an electric signal that is input thereto. The rotary drive source 24 is disposed along the vertical direction of the body 12, with a drive shaft 26 thereof being arranged in an upward direction.

The drive force transmission mechanism 18 includes a rotary body 28, which is provided above the rotary drive source 24 in the interior of the body 12, and a gear 29, which is enmeshed with screw grooves 30 of the rotary body 28. The rotary body 28 is formed in a cylindrical shape, for example, with the helical screw grooves 30 being engraved on the outer circumferential surface thereof. The rotary body 28 is supported rotatably with respect to the body 12 through a shaft 32 inserted through the center thereof. Additionally, the rotary body 28 and the shaft 32 are arranged on the same axis with the rotary drive source 24, the lower end of the shaft 32 being connected through a connector 34 to the drive shaft 26. The connector 34 is connected such that the shaft 32 and the drive shaft 26 remain coaxial, and so that relative displacement between the shaft 32 and the drive shaft 26 does not occur.

More specifically, by driving the rotary drive source 24, the drive shaft 26 and the shaft 32 are rotated together integrally, while at the same time, the rotary body 28 also is rotated integrally therewith.

The gear 29 is formed, for example, with a semicircular shape in cross section, a central portion of the gear 29 being rotatably supported in the body 12 via a support pin 36, and a plurality of gear teeth (teeth) 38 being engraved on the arcuate circumferential surface thereof. The gear teeth 38 are inclined at a predetermined angle with respect to the axis of the support pin 36, and are enmeshed with the screw grooves 30 of the rotary body 28.

The clamp arm 16 is formed, for example, with an L-shape in cross section and is disposed adjacent to the rotary body 28, such that one end portion thereof is axially supported rotatably in the body 12 through the support pin 36. Further, on the other end portion of the clamp arm 16, a projection 42 is formed, which is bent substantially at a right angle with respect to an arm portion 40.

Additionally, by rotation of the rotary body 28, the clamp arm 16, which is enmeshed therewith, is rotated through a predetermined angle about the support pin 36, so that in a clamped condition, the projection 42 is disposed in confronting relation to the gripping member 22 of the support member 20. More specifically, the screw grooves 30 of the rotary body 28 and the gear teeth 38 of the clamp arm 16 function as a worm gear mechanism.

The electric clamp apparatus 10 according to the first embodiment of the present invention is constructed basically as described above. Next, operations and advantageous effects of the electric clamp apparatus 10 shall be described. In the following description, an unclamped state, in which the arm portion 40 of the clamp arm 16 shown in FIG. 1 is positioned vertically upward, shall be taken as an initial position. In this condition, as shown in FIG. 1, a workpiece W in the form of a thin plate is mounted on an upper portion of the support member 20 of the body 12.

First, in the initial position of the electric clamp apparatus 10 shown in FIG. 1, by inputting an electric signal from a non-illustrated controller with respect to the rotary drive source 24 of the rotary drive unit 14, the rotary drive source 24 rotates the drive shaft 26, and along therewith, the rotary body 28 is rotated through the connector 34 and the shaft 32.

In addition, by rotation of the rotary body 28, as shown in FIG. 2, the gear 29, which is enmeshed with the screw grooves 30 of the rotary body 28, rotates in a clockwise direction about the support pin 36, and the clamp arm 16 rotates together with the gear 29, whereby the projection 42 is made to approach the support member 20.

Moreover, by driving the rotary drive unit 14, the rotary body 28 is rotated further, and along therewith, as shown in FIG. 3, by rotation of the gear 29 and the clamp arm 16, the projection 42 comes into abutment against the workpiece W, and a clamped condition is brought about in which the workpiece W is clamped between the projection 42 and the support member 20.

Further, in the aforementioned clamped condition of the workpiece W, by suspending input of the electric signal from the non-illustrated controller to the rotary drive unit 14, a locked state is brought about in which rotary operation of the clamp arm 16 is restricted due to the meshed engagement between the screw grooves 30 of the rotary body 28 and the gear teeth 38 of the gear 29. Owing thereto, the clamped state of the workpiece W can be maintained by the clamp arm 16 without providing a separate locking means for regulating rotary operation of the clamp arm 16.

As described above, with the first embodiment, even in the case that input of the electric signal to the rotary drive unit 14 is suspended, rotary movement of the clamp arm 16 can be restricted by meshed engagement of the gear 29 with respect to the rotary body 28. As a result, once the workpiece W has been placed in the clamped condition, the clamped condition can reliably be maintained.

Further, in the drive force transmission mechanism 18, by utilizing the worm gear mechanism, since there is no need to provide a separate locking means capable of regulating the clamped state of the workpiece W, compared to the case of providing such a locking means, the structure of the electric clamp apparatus 10 can be simplified.

Further, since the clamp arm 16 is rotated by the drive force of the rotary drive unit 14, which is driven by an electric signal, high precision operations of the clamp arm 16 are enabled, and clamping of the workpiece W can be performed with increased accuracy.

Figure 4:
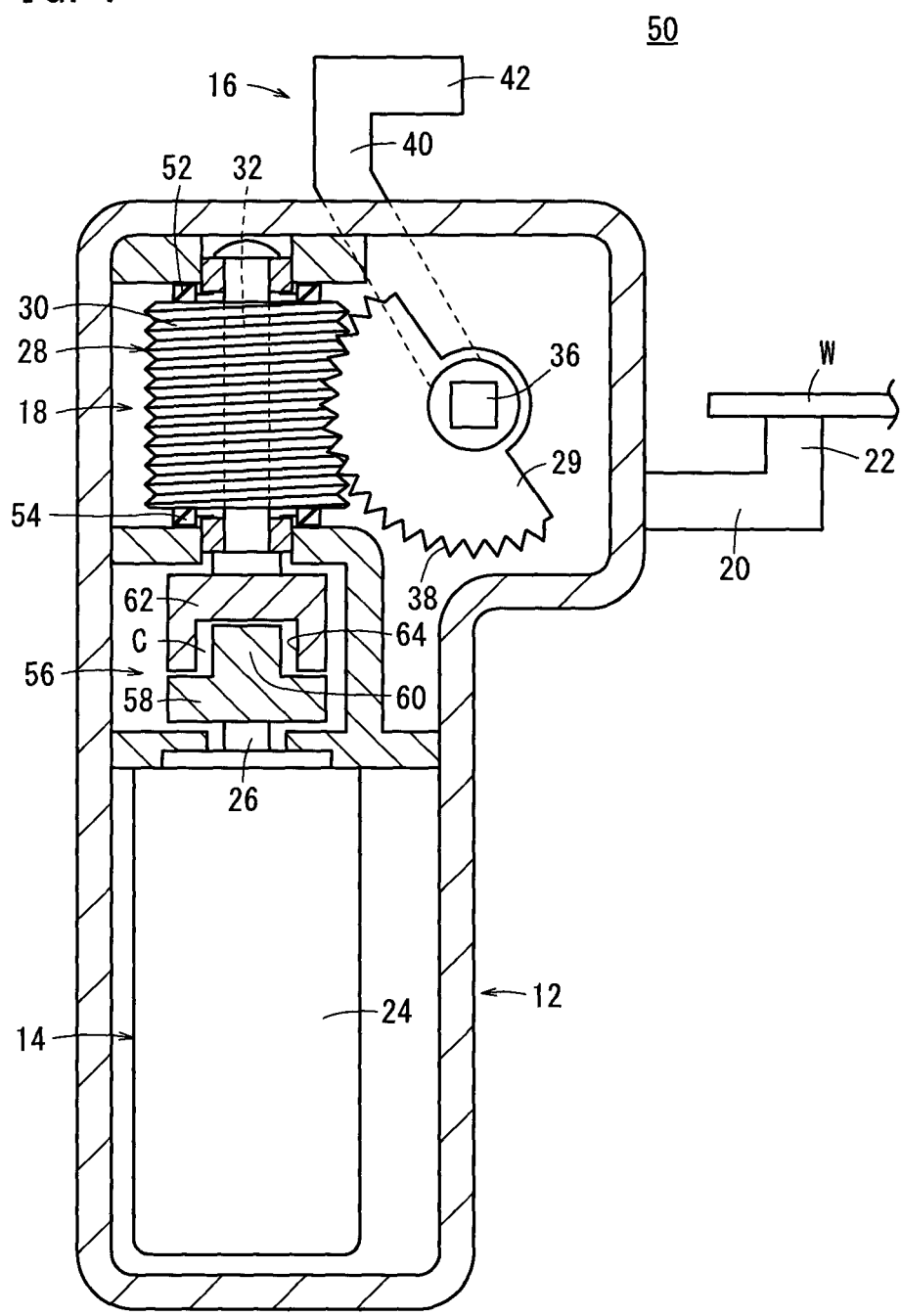
FIG. 4 is an overall structural view showing an electric clamp apparatus according to a second embodiment of the present invention.
Figure 5:
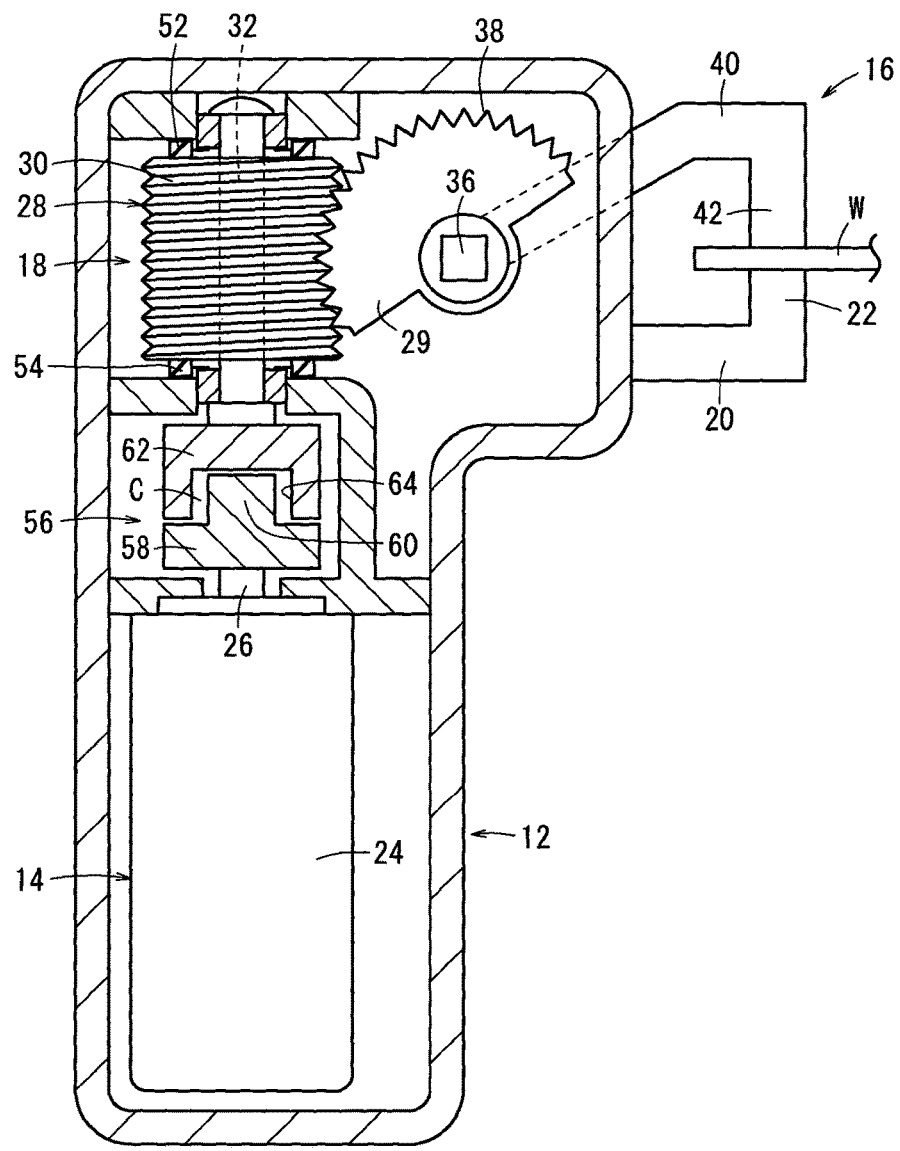
FIG. 5 is an overall structural view showing a clamped state in which the clamp arm in the electric clamp apparatus of FIG. 4 is rotated further to clamp a workpiece.

Next, an electric clamp apparatus 50 according to a second embodiment is shown in FIGS. 4 and 5. Constituent parts thereof, which are the same as those of the electric clamp apparatus 10 according to the first embodiment, are designated by the same reference characters and detailed explanations of such features are omitted.

The electric clamp apparatus 50 according to the second embodiment differs from the electric clamp apparatus 10 according to the first embodiment, in that a pair of first and second dampers 52, 54 are provided on upper and lower portions of the rotary body 28, and the shaft 32 of the rotary body 28 and the rotary drive unit 14 are connected by a coupling mechanism 56 having a small gap therein in the direction of rotation.

In the electric clamp apparatus 50, as shown in FIGS. 4 and 5, the annular first damper 52 is provided on an upper portion in the axial direction of the rotary body 28, and an annular second damper 54 is provided on a lower portion in the axial direction of the rotary body 28. The first and second dampers 52, 54 are formed, for example, from a rubber or resin material having a certain elasticity. The first and second dampers 52, 54 abut against the rotary body 28 and are rotated integrally therewith. Alternatively, in place of the first and second dampers 52, 54, air cushion mechanisms may be provided, in which airtight spaces are provided at regions on the first and second dampers 52, 54, which are capable of urging the rotary body 28 in axial directions by supplying air thereto, for example.

On the other hand, a first connecting member 58 constituting the coupling mechanism 56 is connected to the drive shaft 26 of the rotary drive unit 14. The first connecting member 58 comprises a protrusion 60 that projects outwardly toward the side of the rotary body 28. Further, a second connecting member 62 constituting the coupling mechanism 56 is connected to a lower end portion of the shaft 32, which is inserted through the rotary body 28, and a concave portion 64 recessed at a predetermined depth and in which the protrusion 60 is inserted is formed in a central portion of the second connecting member 62. The protrusion 60 and the concave portion 64 are formed, for example, with rectangular shapes in cross section, with a gap C of a predetermined interval being provided between the concave portion 64 and the protrusion 60.

In addition, by abutment of the protrusion 60 of the first connecting member 58 against an inner wall surface in the concave portion 64 of the second connecting member 62, a rotary drive force of the rotary drive unit 14 is transmitted to the rotary body 28 through the shaft 32.

With the electric clamp apparatus 50 using the aforementioned worm mechanism, for example, when the clamp arm 16 is rotated by driving the rotary drive unit 14 and a clamped condition is brought about in which a workpiece W is clamped as shown in FIG. 5, the clamped condition can be maintained through meshing engagement between the rotary body 28 and the gear 29. However, when an unclamped state is brought about in which the clamped condition is released, a problem may occur in which the state of engagement between the screw grooves 30 and the gear teeth 38 is too strong, and releasing of the workpiece W is difficult to perform.

In this case as well, with the electric clamp apparatus 50 according to the second embodiment, when the driving direction of the rotary drive unit 14 is reversed from the clamped state, the protrusion 60 of the first connecting member 58 is rotated inside the gap C, which is disposed in the concave portion 64 of the second connecting member 62, and upon coming into contact therewith, the second connecting member 62 can be pressed with a strong pressing force. Consequently, the rotary body 28 can be rotated in a direction to release the strongly enmeshed condition between the gear 29 and the rotary body 28.

Further, at the same time, when clamping of the clamp arm 16 is carried out, because a counterclockwise reaction force is applied to the gear 29 through the clamp arm 16, a force is imposed downwardly on the rotary body 28, which is enmeshed with the gear 29, and although a pressing force is applied thereby to press and crush the second damper 54, due to another pressing force applied in a upward direction by the elastic force of the second damper 54 so as to push back on the rotary body 28, the rotation-locked condition between the gear 29 and the rotary body 28 can be alleviated.

More specifically, the first and second dampers 52, 54 are provided on upper and lower portions of the rotary body 28, and due to the gap C, which is provided by the coupling mechanism 56 between the first connecting member 58 connected to the rotary drive unit 14 and the second connecting member 62 connected to the rotary body 28, the clamped state of the clamp arm 16 can easily and reliably be released.

Further, upon being rotated from the unclamped state of the clamp arm 16 shown in FIG. 4, the first damper 52 is provided with the aim of pressing the upwardly-pressed rotary body 28 downwardly, so that similarly, a rotation-locked condition between the gear 29 and the rotary body 28 can be alleviated by the elastic force of the first damper 52.

Furthermore, the aforementioned first and second dampers 52, 54 and the coupling mechanism 56 may both be provided, or alternatively, either the first and second dampers 52, 54 or the coupling mechanism 56 may be provided.

The electric clamp apparatus according to the present invention is not limited to the aforementioned embodiments, and it is a matter of course that various additional or modified structures may be adopted therein without deviating from the essential gist of the present invention.

The invention claimed is:

1. An electric clamp apparatus comprising:
a body;
a drive unit which is driven rotatably by an electric signal;
a clamp arm disposed rotatably with respect to the body for gripping a workpiece; and
a transmission mechanism for transmitting a rotary drive force of the drive unit to the clamp arm,
wherein the transmission mechanism includes a rotary body, which is rotated upon being driven by the drive unit and having helical screw grooves formed on an outer circumferential surface thereof, and a gear connected to the clamp arm and having gear teeth enmeshed with the screw grooves, wherein by rotation of the rotary body, a rotary drive force is transmitted to the clamp arm through the gear,
wherein a first damper made of an elastic material is provided on a first end surface of the rotary body in an axial direction of the rotary body,
wherein the transmission mechanism includes a coupling interconnecting a drive shaft of the drive unit and the rotary body, the coupling includes a first connecting body connected to the drive shaft, and a second connecting body connected to the rotary body,
wherein the first connecting body includes a protrusion projecting towards the rotary body, the second connecting body includes a recessed portion into which the protrusion extends, the protrusion comprising an entirety of the first connecting body located within the recessed portion, the recessed portion having a top surface and an inner surface,
wherein the first connecting body and the second connecting body are connected in a state having a gap there between, the gap extending in a radial direction with respect to an axial direction of the drive shaft and axial direction of the rotary body,
wherein the gap extends from an outer peripheral surface of the protrusion of the first connecting body to the inner surface of the recessed portion of the second connecting body,
wherein the gap extends between an entirety of the outer peripheral surface of the protrusion and the inner surface of the recessed portion such that the entire outer peripheral surface of the protrusion is spaced apart from the inner surface of the recessed portion, and
wherein the protrusion, gap and recessed portion are configured such that the protrusion and recessed portion are able to relatively rotate by a certain angle and such that, following the certain angle of relative rotation of the protrusion and recessed portion, the protrusion and recessed portion are able to forcefully make contact, to release a strongly enmeshed condition between the gear teeth and screw grooves.

2. The electric clamp apparatus according to claim 1, wherein the drive unit and the rotary body are disposed on the same axis.

3. The electric clamp apparatus according to claim 1, wherein a worm gear mechanism is constituted from the screw grooves and the gear teeth.

4. The electric clamp apparatus according to claim 1, wherein a second damper is disposed on a second end surface of the rotary body.

5. The electric clamp apparatus according to claim 4, wherein the first damper and the second damper are configured to rotate with the rotary body.

* * * * *